Dec. 27, 1927. 1,653,874
J. C. POTH
DUMPING UNIT FOR MOTOR TRUCKS
Filed Dec. 2, 1925   3 Sheets-Sheet 1

Inventor
J. C. Poth.
By Lacy Lacey, Attorneys

Dec. 27, 1927.

J. C. POTH 1,653,874

DUMPING UNIT FOR MOTOR TRUCKS

Filed Dec. 2, 1925  3 Sheets-Sheet 3

Inventor
J. C. Poth.

By Lacy & Lacy, Attorney

Patented Dec. 27, 1927.

1,653,874

UNITED STATES PATENT OFFICE.

JOHN C. POTH, OF GALION, OHIO, ASSIGNOR TO PERFECTION STEEL BODY CO., OF GALION, OHIO, A CORPORATION OF OHIO.

DUMPING UNIT FOR MOTOR TRUCKS.

Application filed December 2, 1925. Serial No. 72,745.

This invention relates to an improved dumping unit for motor trucks and seeks, among other objects, to provide a simple and efficient unit which may be readily applied to conventional trucks as now in common use.

The invention seeks, as a further object, to provide a unit embodying a novel base frame for supporting the dumping body as well as the tilting mechanism for the body.

And the invention seeks, as a still further object, to provide a unit embodying a novel tilting mechanism.

Other and incidental objects of the invention not specifically mentioned in the foregoing, will appear during the course of the following description.

Referring now more particularly to the drawings, I have shown my improved dumping unit in connection with a conventional motor truck, the side bars of the chassis frame of which are indicated at 10. Mounted upon said side bars is the usual cab 11.

Figure 2:
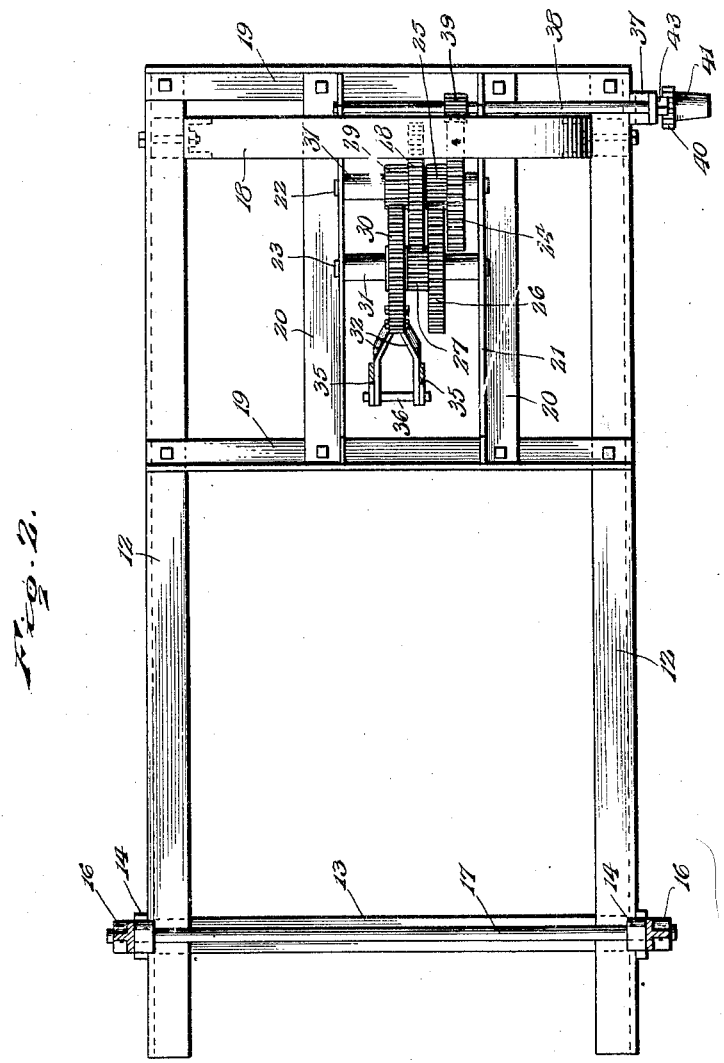
Figure 2 is a plan view particularly showing the base frame and tilting mechanism.
Figure 3:
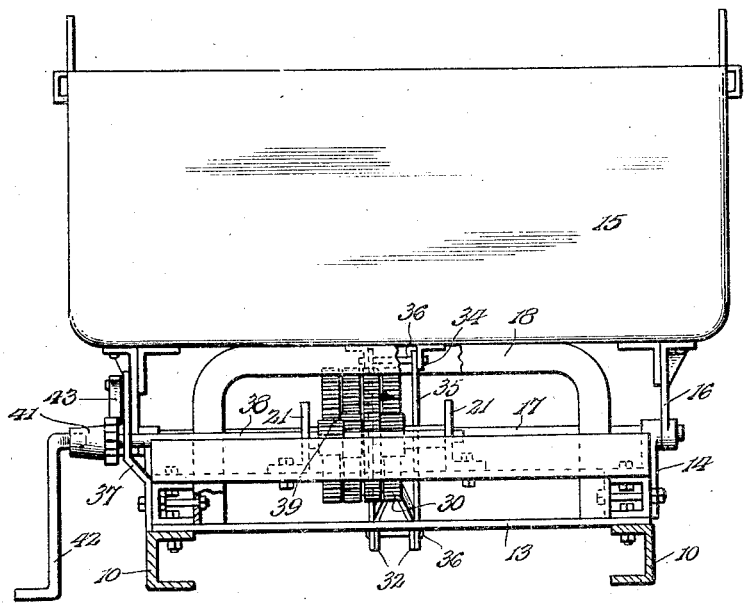
Figure 3 is a sectional view on the line 3—3 of Figure 1, looking in the direction indicated by the arrows.

In accordance with the present invention, I employ a base frame which, as shown in Figure 2, includes a pair of spaced parallel side bars 12, and extending transversely between the side bars, near the ends thereof, are parallel tie bars 13 welded or otherwise secured to the lower faces of the side bars. As brought out in Figure 3, the side bars 12 of the base frame are spaced apart to overlie the side bars 10 of the chassis frame in superposed relation and any approved means may be employed for rigidly connecting the base frame with the chassis frame. Fixed to the outer sides of the bars 12 at the ends of the rearmost tie bar 13 are upstanding brackets 14, and normally lying in spaced parallel relation to the base frame is a dumping body 15 to which is fixed spaced brackets 16 mating with the brackets 14. Extending through said brackets is a cross rod 17 pivotally mounting the body. Snugly fitting between the forward ends of the side bars 12 of the base frame is an inverted U-shaped rest 18 for the forward end of the body, the rest being of a height to sustain the body in horizontal position. As shown in Figure 3, the ends of the rest seat against the foremost of the tie bars 13 and said rest may be bolted to the side bars 12, as shown, or otherwise rigidly fixed thereto.

Extending transversely between the side bars 12 of the base frame at the forward end portion of said frame, are spaced parallel cross bars 19 and extending longitudinally of the base frame between said cross bars are spaced parallel angle rails 20 having widened side flanges 21. The bars 19 are bolted or otherwise rigidly fixed to the side bars 12 and, likewise, the rails 20 are bolted or otherwise rigidly fixed to the bars 19 so that these several bars will cooperate with each other and with the side bars 12 and tie bars 13 to produce a rigid base frame.

Extending through the flanges 21 of the angle rails 20 are spaced parallel shafts 22 and 23. Rotatable on the shaft 22 is a compound gear element comprising a large gear 24 and a small gear 25 integral with the large gear, and meshing with the gear 25 is the large gear 26 of a compound gear element rotatably mounted on the shaft 23. The latter gear element includes a small gear 27 integral with the large gear 26, and meshing with the gear 27 is the large gear 28 of another compound gear element journaled on the shaft 22. This latter gear element includes a small gear 29 and meshing with said gear is a lifting gear 30 journaled on the shaft 23. Fitting over the ends of said shaft 23 as well as over the ends of the shaft 22 are sleeves 31 spacing the several gears with respect to the rails 20.

Figure 1:
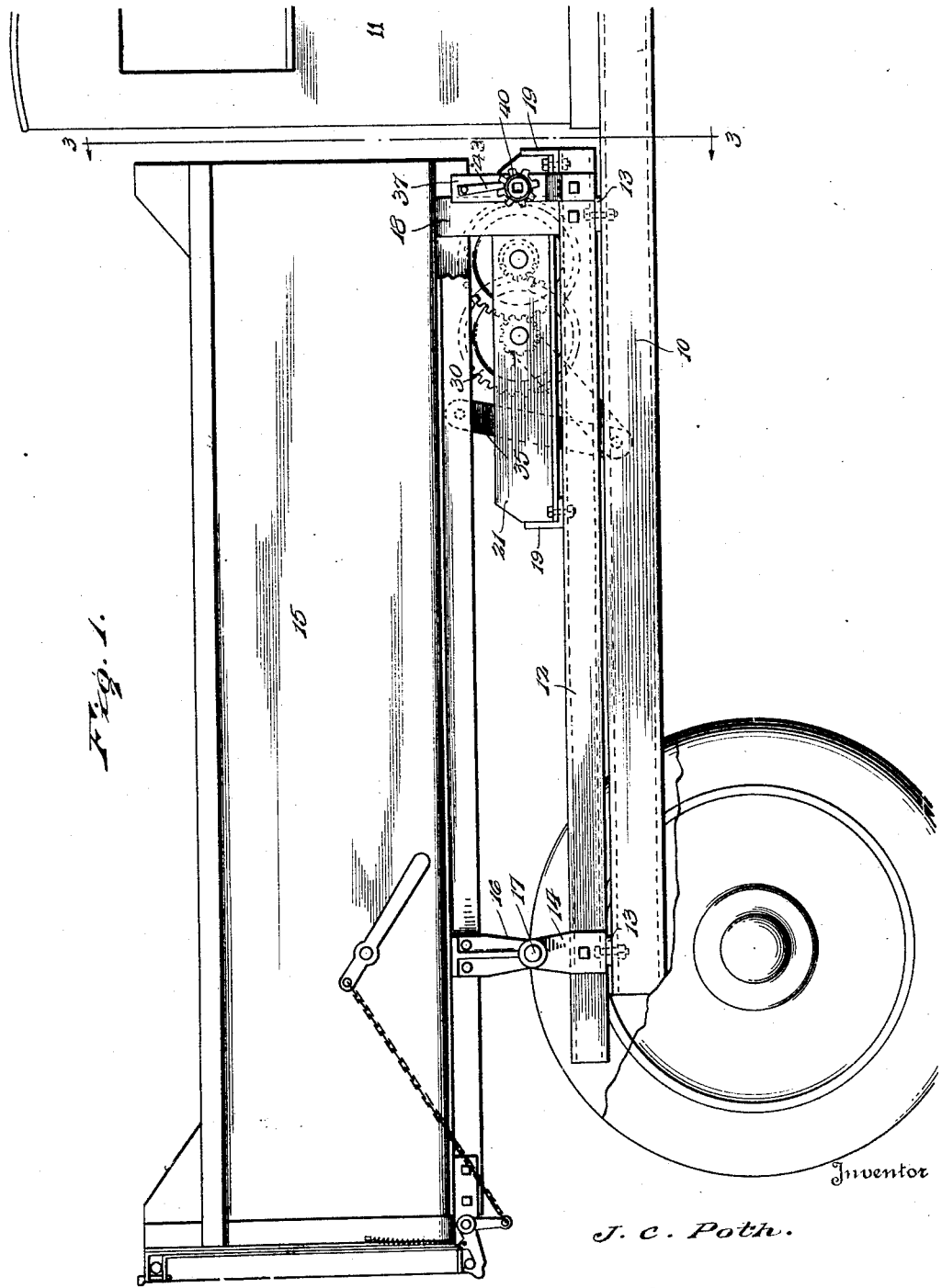
Figure 1 is an elevation showing a conventional truck equipped with my improved unit.
Figure 4:
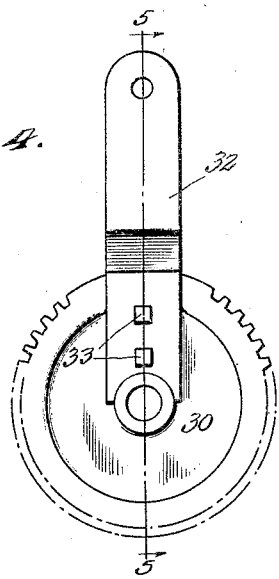
Figure 4 is a detail side elevation showing the lifting gear of the tilting mechanism.
Figure 5:
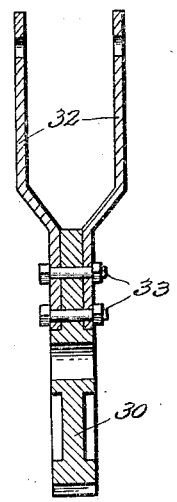
Figure 5 is a sectional view on the line 5—5 of Figure 4, looking in the direction indicated by the arrows, and showing the mounting of the lifting arms of the lifting gear.

Fixed at their inner ends to the gear 30, as shown in Figures 4 and 5 of the drawings, is a pair of radial arms 32 lying flat against opposite sides of the gear and notched at their inner ends to fit the gear hub. The inner ends of the arms are welded to the gear, and reinforcing the welded connections between the arms and the gear are bolts or other suitable fastening devices 33, a particularly rigid and durable construction being thus provided. At the periphery of the gear the arms are offset to extend in spaced parallel relation at their outer ends and, as shown in Figure 1, said arms are normally disposed to incline downwardly and rearwardly with respect to the base frame. Fixed to the bottom of the body 15 are spaced angle bars 34, and extending between the free ends of the arms 32 and said bars is a pair of links 35 pivotally connected with the arms and said bars by pins 36.

Fixed to the outer side of the right hand side bar of the base frame, as seen in Figures 1 and 2 of the drawings, is an upstanding arm 37, and journaled through said arm and through the flanges 21 of the rails 20, is a shaft 38 which extends in front of the rest 18. Fixed to the shaft to mesh with the gear 24 is a pinion 39 and fixed to the outer end of the shaft is a ratchet 40 having a hub 41 which is provided with a socket to receive a suitable crank, as indicated at 42. Pivoted upon the arm to coact with the ratchet 40, as best seen in Figure 3, is a pawl 43.

As will now be seen in view of the foregoing, the crank 42 may be operated for turning the shaft 38, when the train of lifting gears will be turned for rotating the gear 30 and swinging the arms 32 of the latter gear upwardly and tilting the body 15 to dump the load, and, of course, the body may be locked in tilted position by means of the pawl 43. Furthermore, as shown in Figure 1, this pawl may be employed for locking the body in load-carrying position but due to the normally downwardly inclined position of the arms 32, the body will, under ordinary conditions, be maintained in engagement with the rest 18 without the assistance of the locking pawl. I accordingly provide a particularly efficient construction for the purpose set forth and, as will now be perceived, a dumping unit which may be readily applied to conventional motor trucks without the necessity for structural change therein.

Having thus described the invention, what I claim is:

In combination with a frame including parallel side bars, tie bars, end and intermediate cross bars, and a body tiltably mounted upon the rear of the frame, an inverted U-shaped rest for the front of the body extending transversely beneath the same and having depending end portions secured against the forward end portions of the side bars, one of said tie bars extending between said side bars and engaging the lower ends of the end portions of said rest to support the same, angle rails disposed longitudinally of the frame intermediate the side bars and connecting the end and intermediate cross bars, cross shafts mounted in the upright flanges of the rails, complemental gear elements loosely mounted upon the cross shafts and including a lifting gear, an arm extending rearwardly and downwardly from the lifting gear, a pitman connecting the arm with said body, an operating shaft mounted in the said rails and extended at one end beyond a side bar of the frame, a supporting arm for the projecting end of the operating shaft secured to the adjacent side bar of the frame, a ratchet wheel secured to the operating shaft, and a pawl mounted upon the supporting arm and coacting with the ratchet wheel to secure the body and operating parts at the required adjusted position.

In testimony whereof I affix my signature.

JOHN C. POTH. [L. S.]